US012608665B2

(12) United States Patent
Wicaksono et al.

(10) Patent No.: US 12,608,665 B2
(45) Date of Patent: Apr. 21, 2026

(54) CONTACT CENTER WORKLOAD FORECASTS COVERING VARYING TIMESERIES GRANULARITIES AND OPERATING HORIZONS

(71) Applicant: GENESYS CLOUD SERVICES, INC., Menlo Park, CA (US)

(72) Inventors: Bayu Aji Wicaksono, Menlo Park, CA (US); Wei Xun Ter, Menlo Park, CA (US); Christopher E. Johnson, Menlo Park, CA (US); Daniel J. Chapdelaine, Menlo Park, CA (US); Charles David Fico, Menlo Park, CA (US); Vidit Mehta, Menlo Park, CA (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 249 days.

(21) Appl. No.: 18/207,344

(22) Filed: Jun. 8, 2023

(65) Prior Publication Data

US 2024/0412131 A1     Dec. 12, 2024

(51) Int. Cl.
*G06Q 10/00* (2026.01)
*G06Q 10/04* (2023.01)
*G06Q 10/0631* (2023.01)
(52) U.S. Cl.
CPC ....... *G06Q 10/06312* (2013.01); *G06Q 10/04* (2013.01)
(58) Field of Classification Search
None
See application file for complete search history.

(56) References Cited

U.S. PATENT DOCUMENTS

| 9,635,181 B1* | 4/2017 | McGann ............. H04M 3/5238 |
| 2002/0042731 A1* | 4/2002 | King, Jr. ............ G06Q 10/0639 |
| | | 705/7.29 |

(Continued)

OTHER PUBLICATIONS

JM Boulin (Call center demand forecasting: improving sales calls prediction accuracy through the combination of statistical methods and judgmental forecast)—2010—dspace.mit.edu (hereinafter Boulin et al.). (Year: 2010).*

(Continued)

*Primary Examiner* — Hafiz A Kassim
(74) *Attorney, Agent, or Firm* — Taft Stettinius & Hollister LLP

(57) ABSTRACT

A method for selecting forecasting models for generating timeseries workload forecasts for a contact center covering varying timeseries granularities and operating horizons. The method includes selecting, via a first selection process, a first select forecasting model from first candidate forecasting models for forecasting a workload level in accordance with a lower-granularity timeseries. The first selection process may include the steps of: receiving a first timeseries dataset; defining different timeseries datasets within the first timeseries dataset, including a first shorterm dataset and first longterm dataset; testing, using the first longterm dataset, each first candidate forecasting model in accordance with a first longterm cross-validation process; testing, using the first shorterm dataset, each first candidate forecasting model in accordance with a first shorterm cross-validation process; and calculating, for each of the first candidate forecasting models, an combined accuracy score based on the testing.

13 Claims, 7 Drawing Sheets

400

(56)　　　　　　　　References Cited

U.S. PATENT DOCUMENTS

| 2008/0071598 | A1* | 3/2008 | Masuyama | ........ | G06Q 10/0639 |
| | | | | | 705/7.29 |
| 2015/0189088 | A1* | 7/2015 | Surridge | ........ | G06Q 10/063112 |
| | | | | | 379/265.12 |
| 2015/0281448 | A1* | 10/2015 | Putra | .................. | G06Q 10/0633 |
| | | | | | 379/265.03 |
| 2020/0210920 | A1* | 7/2020 | Joseph | ................... | G06N 20/00 |
| 2021/0216848 | A1* | 7/2021 | Poghosyan | ......... | G06F 11/3006 |
| 2022/0027837 | A1* | 1/2022 | D'Attilio | ............ | H04M 3/5175 |
| 2023/0195591 | A1* | 6/2023 | Higginson | ............. | G06Q 10/04 |
| | | | | | 702/186 |

OTHER PUBLICATIONS

Ruan, L., Bai, Y., Li, S. et al. Workload time series prediction in
storage systems: a deep learning based approach. Cluster Comput
(Jan. 13, 2021). https://doi.org/10.1007/s10586-020-03214-y (Year:
2021). (Year: 2021).*
N Baldon (Time series forecast of call volume in call center using
statistical and machine learning methods)—2019—diva-portal.org.
(Year: 2019).*
Search Report and Written Opinion received from WIPO on Jun. 19,
2024 in co-pending PCT application having application No. PCT/
US2024/018537.

* cited by examiner

100

| Time Series Dataset | 402 |

| Training Dataset | Test Dataset | | 404 |

| Training Dataset | Test Dataset | | 406 |

| Training Dataset | Test Dataset | | 408 |

| Training Dataset | Test Dataset | 410 |

| Training Dataset | Test Dataset |
412

400

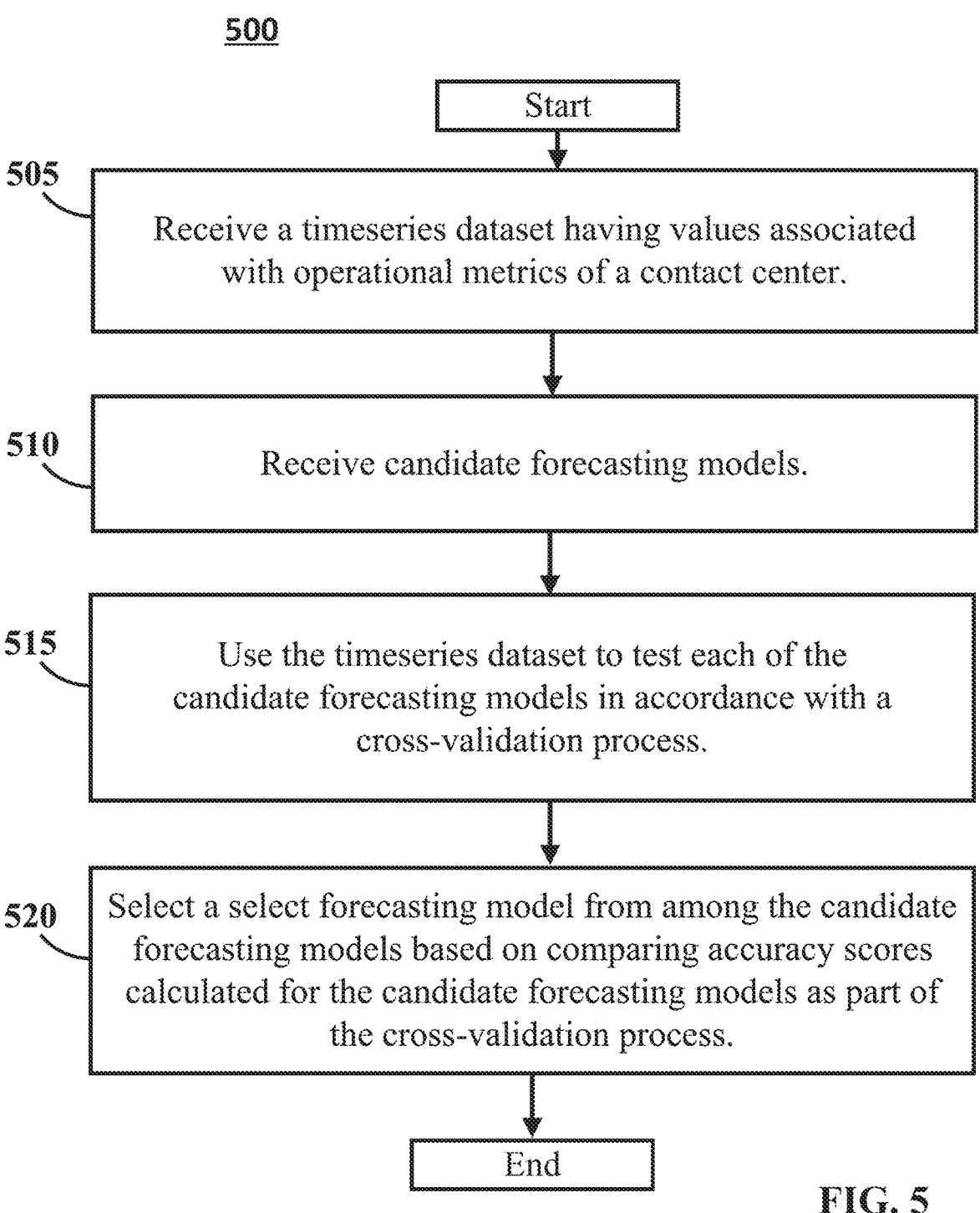

500

Start

505

Receive a timeseries dataset having values associated with operational metrics of a contact center.

510

Receive candidate forecasting models.

515

Use the timeseries dataset to test each of the candidate forecasting models in accordance with a cross-validation process.

520

Select a select forecasting model from among the candidate forecasting models based on comparing accuracy scores calculated for the candidate forecasting models as part of the cross-validation process.

End

FIG. 5

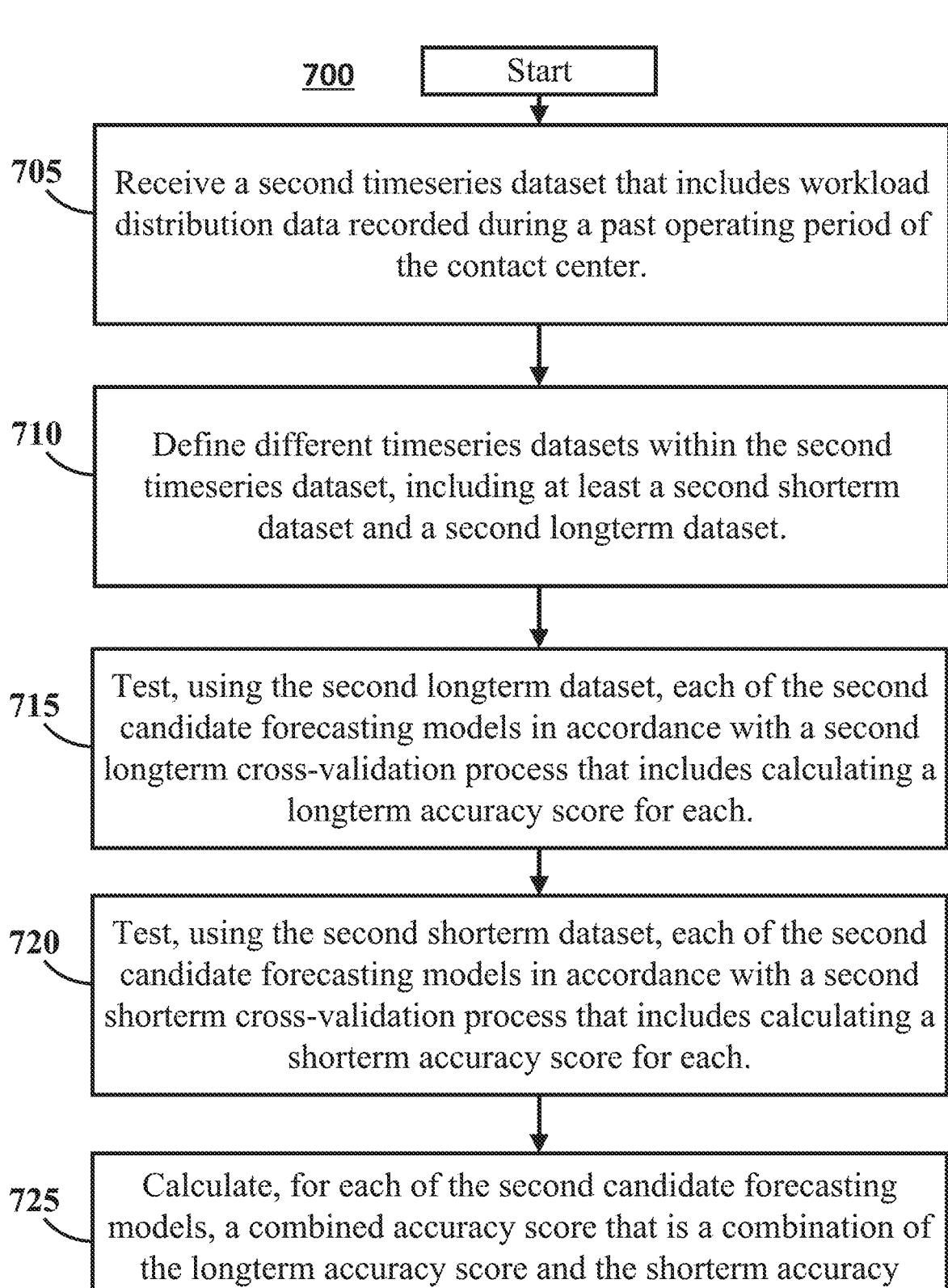

700

Start

705    Receive a second timeseries dataset that includes workload distribution data recorded during a past operating period of the contact center.

710    Define different timeseries datasets within the second timeseries dataset, including at least a second shorterm dataset and a second longterm dataset.

715    Test, using the second longterm dataset, each of the second candidate forecasting models in accordance with a second longterm cross-validation process that includes calculating a longterm accuracy score for each.

720    Test, using the second shorterm dataset, each of the second candidate forecasting models in accordance with a second shorterm cross-validation process that includes calculating a shorterm accuracy score for each.

725    Calculate, for each of the second candidate forecasting models, a combined accuracy score that is a combination of the longterm accuracy score and the shorterm accuracy score.

End

FIG. 7

CONTACT CENTER WORKLOAD FORECASTS COVERING VARYING TIMESERIES GRANULARITIES AND OPERATING HORIZONS

BACKGROUND

The present invention generally relates to analytics and forecasting in the field of customer service and customer relations management via contact centers and associated cloud-based systems. More particularly, but not by way of limitation, the present invention pertains to systems and methods for time series forecasting, including model selection and validation, for generating workload forecasts and staffing plans for contact centers.

As will be appreciated, timeseries data is a sequence of data points representing observations collected at discrete and equally spaced intervals. Timeseries forecasting models may be used to predict or estimate future data points for time-varying phenomena. Timeseries can be chaotic and complex, particularly in the context of contact center metrics, and development of forecasting in this area remains underutilized. Many conventional timeseries forecasting solutions have been shown to be inadequate for predicting such complex phenomena. Nevertheless, modern compute devices are delivering massive amounts of contact center timeseries data that could yield greater efficiencies and effective resource management. Thus, there is a need for improved forecasting techniques in this area.

BRIEF DESCRIPTION OF THE INVENTION

The present invention includes a method for selecting forecasting models for generating improved timeseries workload forecasts for a contact center applicable to varying timeseries granularities and operating horizons. The method including selecting, via a first selection process, a first select forecasting model from first candidate forecasting models for forecasting a workload level in accordance with a lower-granularity timeseries. The first selection process may include the steps of: receiving a first timeseries dataset, the first timeseries dataset including workload data recorded during a past operating period of the contact center; defining different timeseries datasets within the first timeseries dataset, the different timeseries datasets including at least a first shortterm dataset and a first longterm dataset; testing, using the first longterm dataset, each of the first candidate forecasting models in accordance with a first longterm cross-validation process, wherein the first longterm cross-validation process includes calculating a longterm accuracy score for each of the first candidate forecasting models; testing, using the first shortterm dataset, each of the first candidate forecasting models in accordance with a first shortterm cross-validation process, wherein the first shortterm cross-validation process includes calculating a shortterm accuracy score for each of the first candidate forecasting models; calculating, for each of the first candidate forecasting models, a combined accuracy score that is a combination of the longterm accuracy score and the shortterm accuracy score of the first longterm cross-validation process and the first shortterm cross-validation process, respectively; comparing the combined accuracy scores for each of the first candidate forecasting models and, based on the comparison, selecting one of the first candidate forecasting models as the first select forecasting model. The method may further include identifying a second select forecasting model, wherein the second select forecasting model is configured to forecast a distribution that distributes a workload level across a higher-granularity timeseries defined within the lower-granularity timeseries. In response to identifying the first select forecasting model and the second select forecasting model, the method may continue by automatically: executing at least one instance of the first select forecasting model to forecast a workload level applicable to the lower-granularity timeseries for a future operating period of the contact center; and executing, by providing the forecasted workload level for the future operating period as an input, at least one instance of the second select forecasting model to forecast a distribution that distributes the forecasted workload level of the future operating period across the higher-granularity timeseries defined therewithin.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein:

FIG. 5 is a simplified flow diagram of a method related to selecting timeseries forecast models and forecast model validation in accordance with embodiments of the present disclosure;

FIG. 7 is a simplified flow diagram of another alternative method related to selecting timeseries forecast models and forecast model validation in accordance with embodiments of the present disclosure.

DETAILED DESCRIPTION

Figure 1:
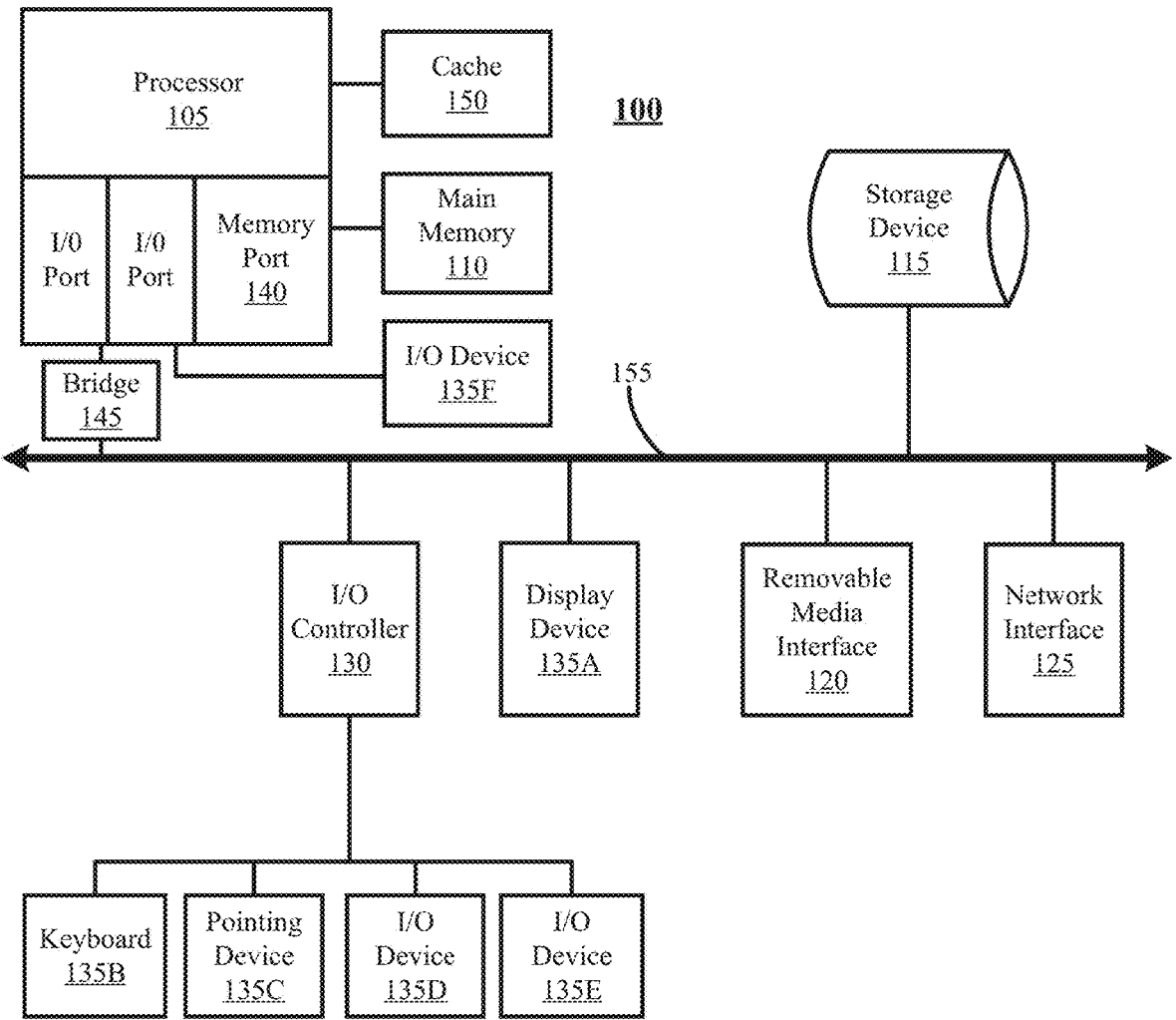
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures-such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (Saas) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. It should be understood that, unless otherwise limited, the computing device 100 may communicate with other computing devices 100 via any type of network using any conventional communication protocol. Further, the network may be a virtual network environment where various network components are virtualized.

Contact Center

Figure 2:
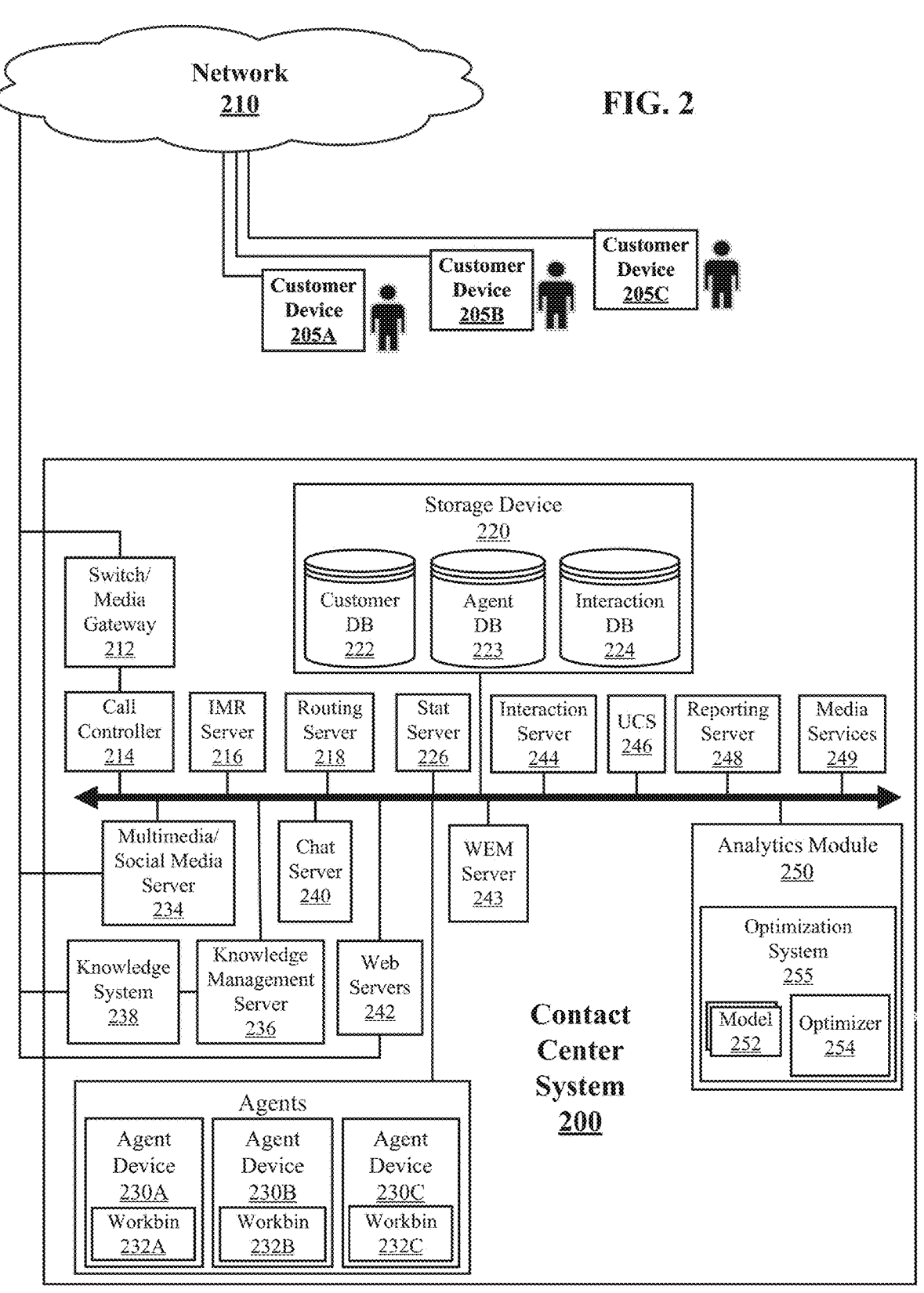
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VOIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chat-bots", and the like.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, tele-marketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a tele-phone, smart phone, computer, tablet, or laptop. In accor-dance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communica-tions (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or imple-mented via software. For example, the switch 215 may include an automatic call distributor, a private branch exchange (PBX), an IP-based software switch, and/or any other switch with specialized hardware and software con-figured to receive Internet-sourced interactions and/or tele-phone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling compo-nents of the contact center system 200. The call controller 214 may be configured to process PSTN calls, VOIP calls, etc. For example, the call controller 214 may include com-puter-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is deter-mined that an inbound communication should be handled by a human agent, functionality within the routing server 218 may select the most appropriate agent and route the com-munication thereto. This agent selection may be based on which available agent is best suited for handling the com-munication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of inter-action, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particu-lar customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between custom-ers and contact centers. More generally, it should be under-stood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored there-within or transmit data thereto for storage.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VOIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like. The models 252 may include timeseries forecasting models as described in more detail below.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VOIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Forecasting Contact Center Workload

As contact centers evolve to become more strategic, management is faced with an ever evolving array of complex considerations. At the root of this is the difficult task of properly balancing goals that often oppose each other, such as reducing costs, increasing customer satisfaction and growth, and increasing agent satisfaction. Contact centers be constantly adapting to serve more sophisticated and educated customers who expect immediate attention and service on multiple media channels. This requires a flexible pool of agents with varying skillsets coupled with efficient agent scheduling and management. With agent wages accounting for up to 70% of a contact center's total operating costs, the importance of properly managing these resources cannot be understated.

This challenging task requires a powerful Workforce Management (WFM) solution with forecasting, hiring, and scheduling features, as well as capabilities that can balance the contact center's business needs with individual agent performance and preferences. At the same time, scheduling solutions must be both flexible to accommodate different configurations and easy to use for all the varied types of users in a contact center. It also requires that contact centers broaden their definition of WFM and see how it can work with and utilize complementary solutions like Quality Monitoring (QM), Training and Performance Management, as well as Reporting and Analytics to accelerate efforts in reducing costs and increasing agent and customer satisfaction.

In short, WFM is the art of having the right number of skilled people and supporting resources in place at the right times to handle an accurately forecasted workload at the desired service level. Because of competing objectives within the contact center and high level of complexity, for WFM to be effective, it must take a comprehensive approach in order to balance and optimize efficiency, agent productivity and satisfaction, and customer retention and revenue growth.

WFM has evolved from a purely tactical to a more strategic role in the contact center industry. This transformation is exemplified by the blurring and disappearance of the boundaries between previously separate and disparate software applications used within and beyond the contact center. As part of this evolution, WFM is being transformed by the blending and inclusion of strategic capacity planning as well as training and performance management capabilities.

Nowadays, the contact center business faces a plethora of challenges such as new contact channels, complex skill set requirements, and elevated customer expectations. It has been observed that a shift in customer preferences that leads to dynamic changes in the flow of calls. With the advent of innovative technologies and consumer demand, contact centers have started handling diverse types of communication mediums, such as inbound and outbound calls, emails, chats, text messaging, and social media. The successful management of a contact center requires an efficient workforce management (WFM) solution in place.

WFM may include an integrated set of processes that a contact center uses to secure the right number of people, with the right skills, at the right time. Thus, to create and manage agent schedules, contact center managers need an accurate forecast of demand at the weekly or the interval level such as daily or hourly. WFM systems help organizations gain insights into business requirements, such as the exact number of employees needed to handle several interactions at a given time of the day, week, or month. To build a good staffing plan, it is imperative to obtain an accurate demand or workload forecast. With an imprecise workload forecast, the effort to calculate required staff numbers and create detailed schedules is often wasted.

Thus, for contact centers, workload forecasting is the backbone of the WFM cycle. It is the process of predicting or inferring the number of incoming workload volumes for an upcoming intervals: days, weeks, months, or even years. It draws on history, science, and insights to predict the future workload and anticipate call drivers. By identifying trends and patterns, forecasting future workload volume becomes more accurate, which can lead to reduced inventory costs, lower overall personnel costs, and increased customer satisfaction. In forecasting, the main objective is to produce an accurate forecast of interaction volume at contact centers and then determine the number of staff required. A contact center manager can then plan, hire and/or schedule labor based on the forecast result weeks or months in advance.

The present disclosure teaches systems and methods associated with continuous forecasting, which is a dynamic workload forecast that is regularly delivered to the planners that allows for a continuous staffing and planning activity by fulfilling the need for staffing requirements for any scheduling or capacity planning scenarios. This is done by automation and leveraging the cloud architecture and infrastructure that cloud provides, which thereby minimizes human interaction when building the forecast models. Planners will be able to override and modify the theoretically best forecast according to their business needs and insights to gain better accuracy in the present continuous forecasting feature. As will be seen, workload forecasting primarily uses timeseries analysis and forecasting to train and retrain its models combined with machine learning cross-validation process to produce the most optimal forecast. This process is repeated on a continuous and regular bases as the most recent batch of actual workload data becomes available.

As will be seen, historical interaction data of a contact center is recorded as events and subsequently summarized in timeseries datasets that are used in various forecasting modeling technologies. As will be appreciated, a timeseries is defined as a sequence of data points, measured at successive points in time spaced at intervals over a particular time period. Examples of timeseries include the recorded daily closing value of the Dow Jones index or the flow volume of the Nile River. Timeseries are typically used in statistics, pattern recognition, sales forecasting, fiscal and budgetary analysis, weather forecasting, control engineering, and communications engineering as well as many other applications. Analyzing timeseries is therefore crucial to gain insight into the past that can be projected into the future.

Timeseries analysis includes methods for analyzing timeseries data to extract meaningful statistics and other characteristics of the data, while forecasting is the process of making statements about events whose actual outcomes have not yet been observed. A commonplace example is estimating a value of some variable at some specified future date or time. The forecasting process can be based on educated guesses, expert opinions, or past history of data values, known as timeseries—this is called timeseries forecasting. Timeseries forecasting is the use of a model to predict future values based on previously observed values. While regression analysis is often employed in such a way as to test theories that the current values of one or more independent timeseries affect the current value of another timeseries, this type of analysis of timeseries is not called "timeseries analysis".

In regard to its components, timeseries data is a collection of observations of well-defined data items obtained through repeated measurements over time. An observed timeseries can be decomposed into several different types of components, including trend, seasonality, cyclicity, and white noise or randomness.

In regard to trend, this is the tendency of the measured observation to increase or decrease over a period of time. A trend can be a smooth, general, long-term tendency. For example, population increases over a period of time, price increases over a period of years, production of goods on the capital market of the country increases over a period of years. These are examples of an upward trend. The sales of a commodity may decrease over a period of time because of better products coming to the market. This is an example of a declining trend or downward trend. It is worth noting, however, that it is not always necessary that the increase or decrease is in the same direction throughout the given period of time. Sometimes trend is referred to as "changing direction," when it might go from an increasing trend to a decreasing trend, or vice-versa. A trend can be positive or negative depending on whether the timeseries exhibits an increasing long-term pattern or a decreasing long-term pattern. If a timeseries does not show an increasing or decreasing pattern, then the series is considered stationary in the mean. A trend can be both linear and non-linear by nature.

In regard to seasonality, this occurs when the timeseries exhibits regular and predictable patterns during the same month (or months) every year, or during the same quarter every year. Seasonal effects are usually associated with calendar or climatic changes, and thus generally occur at a fixed frequency. For example, more wool clothes are sold in winter than in the season of summer, or that hotel industry can expect more calls during the summer than winter season, or regardless of the trend, it is observed that in each year more ice creams are sold in summer and very little in the winter season. The seasonal variations are rhythmic forces that operate in a regular and periodic manner over a span of less than a year. This variation will be present in a timeseries if the data are recorded hourly, daily, weekly, quarterly, or monthly.

For most businesses and economic data, the cyclical component is measured in periods of many years, usually decades, and so is usually not present in the typical timeseries analysis. These are variations that operate over a span of more than one year and are not of a fixed frequency. This component reflects broad swings about either side of the trend line. Cyclicity usually results from changes in economic conditions. For example: the ups and downs in business activities are usually the effects of cyclical variation. A business cycle showing these oscillatory movements must pass through four phases: prosperity, recession, depression, and recovery. In a business, these four phases are completed by passing one to another typically in this order. Many people confuse cyclic behavior with seasonal behaviors, but they are really quite different. If the fluctuations are not of a fixed frequency, then they are cyclic; if the frequency is unchanging and associated with some aspect of the calendar, then the pattern is seasonal. In general, the average length of cycles is longer than the length of a seasonal pattern, and the magnitudes of cycles tend to be more variable than the magnitudes of seasonal patterns. The error component is a random increase or decrease of the timeseries variable occurring for a specific time period. These fluctuations are purely random and are unforeseen, unpredictable, and erratic by nature. These variations are also referred to as residual variations since they represent what is left out in a timeseries after trend, cyclical, and seasonal variations. For example, irregular fluctuations result due to the occurrence of unforeseen events like floods, earthquakes, wars, famines, etc.

Due to the nature of the continuous forecast of the present invention—with it constantly changing and the need to display a single source of truth forecast—new UI and user experience concepts were developed. The continuous forecast features must support the ability for users to make their changes via "modifications," group similar modifications together in an "override," which can then be published to override the system-generated continuous forecast values. The UI must also handle the complexity of showing two years into the past and two years into the future at various granularity values, which creates massive datasets. To help users navigate and understand the continuous forecast of the present invention, a new UI element to the screen called the "View Toggle" is introduced. View Toggle has three options: Historical, Trend and Forecast. The Trend view may be the default display when the user launches the continuous forecast. A "Now" line has been added to help users understand where today is on the chart. An analysis tab will provide various selections to the user for confirmation and validation of the forecast. The Trend view displays a mix of both History and Forecast, giving the user a good idea of the "trend" from the past into the future for their continuous forecast. An in regard to the historical view, this view shows the past actuals for the forecast, the left side of the now line. Finally, the forecast view displays the future of the continuous forecast to the right side of the now line. Due to the large size of the continuous forecast with its history, a display ratio toggle is added to allow users to control the length of time displayed on both sides of the Now line. Forecasters also need the ability to see their forecasts in various granularities, as this helps them identify trends. The available granularities may include monthly, daily, weekly, 60 min, 30 min and 15 min. These granularities are available for the full two-year length of the continuous forecast. This is a significant function enabled by a continuous forecast, as it helps forecasters take a "high level" look using a large time granularity or dig deeper into their forecast by viewing a smaller time granularity.

As previously mentioned, the first and foundational step of scheduling for a contact center is accurately predicting the workload or demand that will be introduced into the contact center system over future planning periods. A basic contact center workload forecast can be specified as a timeseries sequence of metrics, such as volume offered, number of interactions handled, and average handle time (AHT), corresponding to a time interval and can be generated for a multitude of time granularities, e.g., 5-minute, 15-minute, 30-minute, or hourly, weekly, monthly, etc., depending on staffing optimization needs and whether for long-term, strategic hiring or short-term, tactical scheduling activity. These workload forecasts then can be converted into staffing requirement forecasts by staffing models, as will be discussed more below.

A workload forecasting of the present invention includes the selection of an optimal forecasting methodology or model for applying to a given timeseries data. A model may be trained with a set of hyper-parameters that optimizes KPI metrics as a way to validate the accuracy of the forecast, for example, by calculating a mean squared error or median absolute deviation. In one example, Hadoop/Spark EMR cluster jobs may be run to retrain or retrain the models, which are then persisted in a cloud-based data persistence layer, such as AWS S3 or DynamoDB, to be used for any workload forecasting API requests to be processed the next day. Example embodiments may leverage the best forecasting model, which may be selected per a retraining/validation process from the previous batched dataset, for forecasting a workload level in a next operating period. What is referred to as ad-hoc forecasting may be available as a fallback in case there is an issue with the previous night's batch processing, or when there is a change in the configuration of the queues or other systemic change in planning groups or routing strategy. This also acts as a standalone API request. The core algorithm from the ad-hoc process may be the same as the one that is run during the nightly batched process. This is to ensure that there is consistency in the result quality from both processes.

In example embodiments, the workload forecasting step may take in historical timeseries data to be forecasted, along with any causal and/or correlated timeseries as drivers or predictors to the forecast results. Examples of a causal series could be the number of subscribers or sales that drive the forecast of call volumes, i.e., as the number of subscribers or sales increase so does the expected calls that are generated by those subscribers or buyers. Further, multiple hierarchies of temporal (or time-dimensional) timeseries streams may be created whenever a workload forecasting request is made. This means that a single timeseries input data would be summarized and subsequently forecasted for different time hierarchies (or granularities) to gain better accuracy both on the long-term, i.e., weekly, daily, as well as the short-term horizon, which includes hourly, and 5-/15-/30-minute interval granularities (or as specified by the user). A lower granularity stream, e.g., the weekly timeseries, may be used both to determine long-term seasonal and trend patterns, as well as to serve as the baseline for the higher granularity forecasts (i.e., daily and interval-level) via distribution. For example, daily forecasting activity may be processed as a week-to-day distribution rather than forecasting the raw daily numbers directly. Thus, in accordance with certain embodiments, the goal for the higher granularity forecasts is to come up with the best representative distribution to be applied against the weekly workload forecast. This makes the forecast more consistent for both the long- and short-term horizon.

A forecasting activity starts from basic knowledge about what has already occurred. Available inputs are then reviewed and iterations developed in an effort to find the best prediction of the future. As the saying goes, "Garbage in, Garbage Out"—so inputs have to be based on accurate data. For example, historical sales units and pricing can help create a basis for current expectations, that is, if we apply a growth rate to historical sales, we can have a basic sales forecast. That said, forecasting is more art than science and forecasters know that getting access to the right data is only the first step.

The next step from having accurate data, and one of the most important inputs, is knowledge of the business. It is imperative for forecasters to know what events happened in the past which can affect future projection of the metric of interest, e.g., sales. For example, knowing about a mail campaign that lets customers know about certain deals happening can inform the forecasters that a spike in sales may be forthcoming so as to be included in the forecasting consideration. It is also important to stress the limitation of historical events affecting the future, as they are often can be one-off activities or can have a different impact in magnitude to future events. Thus, forecasters can also typically modify a base forecast using foreknowledge information about what is coming and its perceived impact, e.g., incorporating known events that will occur in the future, such as mail campaign happening or planned outages, which can have impact to finance, whether positive or otherwise, that is different from the same event that happened last year.

Figure 3:
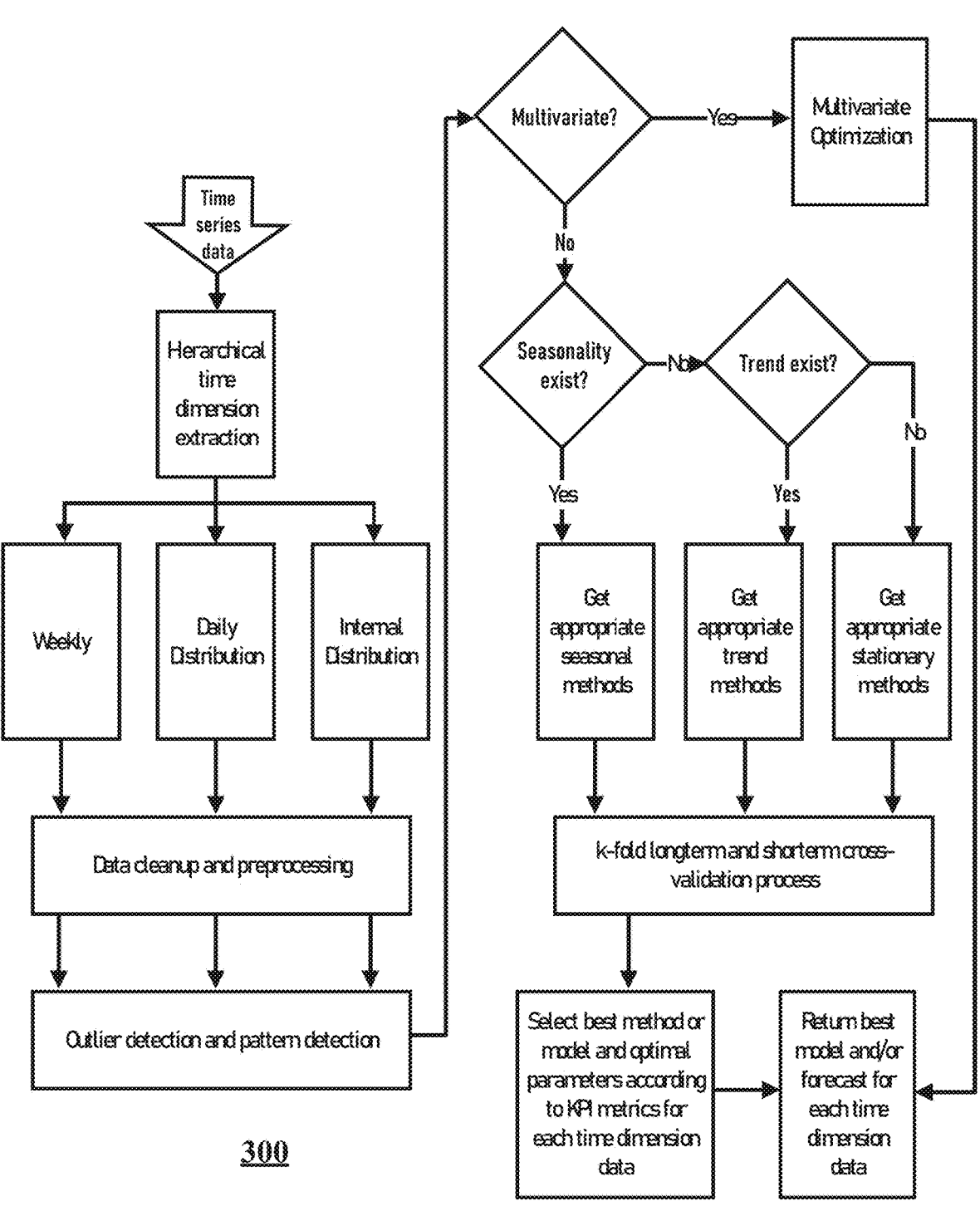
FIG. 3 is a simplified block diagram of at least one embodiment of a cloud-based system related to selecting timeseries forecast models and forecast model validation.

With reference to the logic flow diagram 300 of FIG. 3, a workload forecast for a contact center is typically produced in accordance with the following components. First, historical data is needed. This may be referred to as the input timeseries. Second, the historical data has to include contact center metrics, such as calls offered, interactions handled, average handle time (AHT), etc. Such metrics can be cumulative, average, or percentage. Third, historical data frequency is needed. This is the time interval between successive points in historical data. Fourth, a forecast frequency, i.e., the frequency of the forecasted timeseries, is needed. Fifth, a forecast length must be known, which is the length of the period for which we want the forecast. Sixth, a time zone for which the forecast is generated is specified. And seventh, the starting time from which the forecast is generated must be known.

As indicated in FIG. 3, the process may begin by receiving the timeseries data and extracting hierarchical time dimension aspects therefrom. Each of the different temporal streams, shown as weekly, daily distribution, and internal distribution, then undergoes data cleanup, which may include different aspects of feature engineering and processing. Feature engineering and data processing may first be done to each of the timeseries data streams and may include data summarization and aggregation. Other actions of this type may include missing data imputation, daylight savings time corrections, sparse data normalization, data transformation such as logarithmic normalization, level shift adjustments, and cold-start data problems. This ensures that we feed high quality data to the forecasting algorithm and models, so that underlying trends are more effectively recognized.

In timeseries analysis and more generally in statistics, missing data occurs when no data value is stored for the variable in an observation. Timeseries data are records taken through time, so missing observations are quite common. In the contact center application, missing data can occur for assorted reasons such as a failure or outages in the recording system or due to holiday or special events. Different solutions need to be in place to address these different causes. For example, for a recording failure, the missing values may be estimated as being similar to the surrounding values. For the missing data on holidays like Christmas or New Year, the day may be tagged as a special day and the missing values disregarded. When one or more observations are missing, it may be necessary to obtain estimates of the missing values. By including estimates of missing values, a better understanding of the nature of the data is possible with more accurate forecasting. Therefore, on normalizing missing data, the present algorithm may interpolate the data using a zero value, mean value or LOESS (local regression), depending on the characteristic of the data surrounding the missing values.

As will be appreciated, timeseries are characterized by a level, which is the average value in the timeseries. A level shift change is a more permanent change in the mean (level) of the timeseries, which is in contrast to anomalies where the timeseries returns to its previous level at trend after a brief period. A level shift, for example, may result from product launches, consolidating multiple call type queues in a call center, logging changes, or external events. At a minimum, adjusting for level changes results in a longer effective timeseries, and often makes trend estimation easier when the models are finally fit. Further, identifying change points is important in modeling timeseries. Change points are characterized by a sudden increase or decrease in the mean of the timeseries so that a more representative trend pattern can be projected into the future forecast appropriately. For this purpose, a rolling window algorithm and dual model consensus may be used to identify potential change points, and then z-statistic analysis may be used to determine the most significant change point (MSCP). The level shift then may be computed as the difference in means of before and after series with reference to the MSCP and the necessary adjustments in the data can be made.

Another consideration involves cold starts. A cold start refers to the warmup period that contact centers undergo at the beginning of their operations, which often happens during a trial or experimental period. As a result, the call or interaction volumes in this initial period are not reflective of usual business operations. The data points in the warmup period may be at an entirely different level than the rest of the data. Cold starts need to be identified at the beginning of the timeseries data so they do not adversely impact forecasting efforts.

Next, detecting outliers is important in forecasting. Outlier detection is performed to identify data points that are significantly different from other observations. Outliers represent unusual values in a dataset and should be accounted for. Outliers are problematic for many statistical analyses because they can cause tests to either miss significant findings or distort actual results. Thus, detecting and normalizing outliers is a crucial step towards getting a proper and accurate forecast.

As shown in FIG. 3, once the timeseries data is processed, scrubbed, and otherwise "cleaned", pattern detections for seasonality, trends, and stationarity are performed to ensure that proper candidate models are identified to proceed to the next step in the process, which, according to certain embodiments, involves a cross-validation process. The cross-validation process of the present invention then narrows the candidate models to a select model, which may then be used to produce operational workload forecasts for the contact center, which are then used to make resource and staffing plans over a future operating period.

Specifically, from the results of the cross-validation process, which, as indicated in FIG. 3, may include k-fold longterm and shorterm cross-validation, a best or select forecasting model is identified, which may be based on accuracy scores according to KPI metrics for each time dimension dataset. As describe in more detail below, depending on the patterns that are detected in the timeseries dataset, a multitude of statistical forecasting methodologies are selected as candidate models. These methods, such as ARIMA, classical decomposition, dynamic regressions, Holt-Winters, as well as other models are compared and evaluated against one another against each other using a specifically configured cross-validation process. The result is the selection of a forecasting model that produces an effective forecast that is applicable to varying operating horizons and temporal granularities. As will be seen, this selection may be completed using a process called k-fold cross-validation across different validation time horizons in accordance with a rolling horizon. As will also be seen, ensemble models may be included in this comparison.

Cross-validation, sometimes called rotation estimation or out-of-sample testing, is a machine-learning model validation technique for assessing how the results of a statistical analysis will generalize to an independent data set. It is mainly used in settings where the goal is prediction, and one wants to estimate how accurately a predictive model will perform in practice. In a prediction problem, a model is usually given a dataset of known data on which training is run (called the training dataset), and a dataset of unknown data (or first seen data) against which the model is tested (called the test dataset). The goal of cross-validation is to simulate or test the model's ability to predict new data that was not used in estimating or training it, in order to flag problems like overfitting or selection bias. Furthermore, it can also give an insight into how the model will generalize to an independent dataset, i.e., an unknown dataset, for instance from a real problem. One round of the cross-validation process involves partitioning a sample of data into complementary subsets, performing the analysis on one subset, i.e., the training dataset, and validating the analysis on the other subset, i.e., the test dataset.

In accordance with the present disclosure, to reduce variability, multiple rounds of cross-validation may be performed using different partitions, and the validation results may be combined or summarized, for example, the results may be averaged over the multiple rounds to give an overall estimate of the model's predictive performance. As used herein, these cross-validation "rounds" may be referred to as "folds", and the number of times these cross-validation rounds is performed may be represented by "k" (hence, k-fold cross-validation). Thus, the cross-validation may combine or average measures of fitness in prediction to derive a more accurate estimate of model prediction performance.

Figure 4:
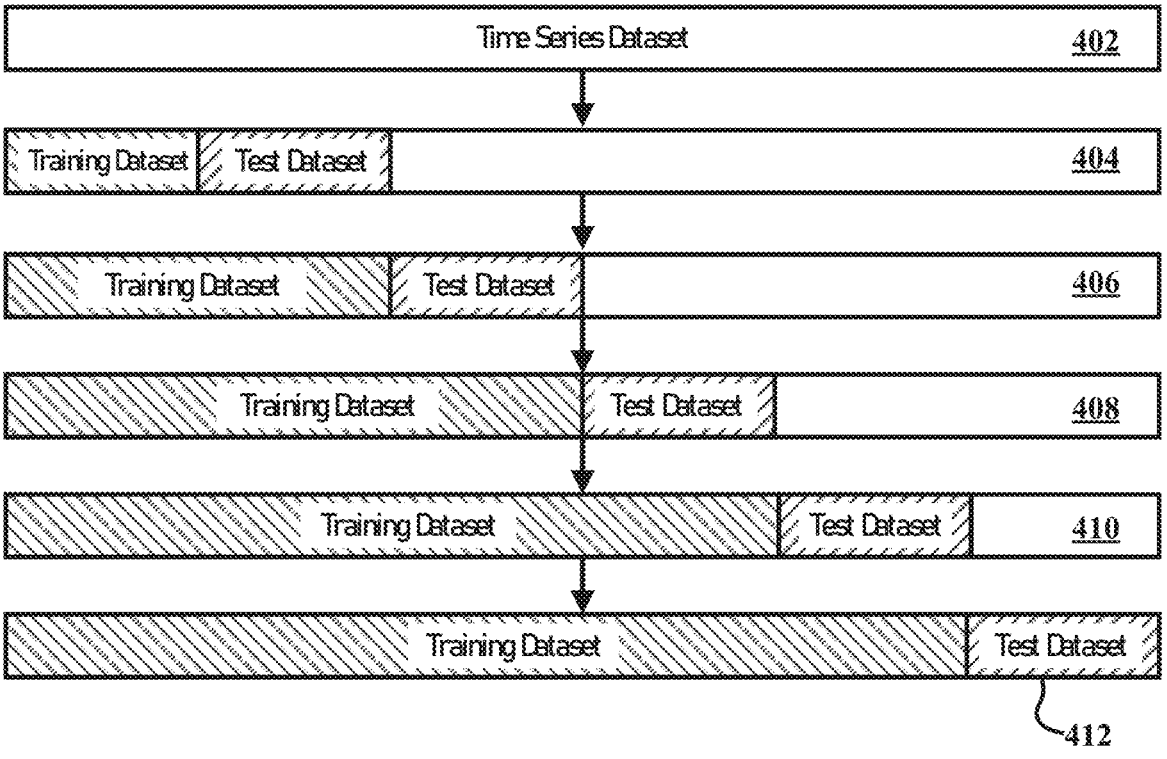
FIG. 4 is a simplified diagram block diagram relating to a rolling horizon validation process in accordance with embodiments of the present disclosure.

In accordance with exemplary embodiments of the present invention, for timeseries data, the cross-validation process is done pursuant to a particular type of "rolling horizon", an example of which is shown in FIG. 4. This rolling horizon methodology for cross-validation has been found to be a highly effective way of selecting a forecasting model from among candidate forecasting models. When the forecasting model is selected in this fashion, the accuracy of workload forecasts covering both longterm and shorterm operating horizons produced by that single selected forecasting model can be significantly improved. As will be seen, with the rolling horizon, the timeseries dataset may be divided into a training dataset and test dataset, with the division between the sets moved forward (i.e., moved forward in time within the timeseries) according to a specific strategy.

The rolling horizon cross-validation process may include dividing the operating period covered by the timeseries dataset 420 to create particular sub-periods. The timeseries dataset 420, in its entirety, may be described as covering a particular operation period, or simply "period". To create unique divisions of training data and test data, sub-periods may be defined within the period, which are then used to define the training and test datasets. Thus, a sub-period of the training dataset (or "training dataset sub-period") is the portion of the period from which the observations making up the training dataset are taken, and a sub-period of the test dataset (or "test dataset sub-period") is the portion of the period from which the observations making up the test dataset are taken. The particular divisions shown in the timeseries datasets 404, 406, 408, 410, and 412 of FIG. 4 represent an example of a rolling horizon, as the division point, or "horizon", between the two dataset sub-periods advances or "rolls" forward in time as the successive folds are defined. As will be appreciated, this is how the unique training and test dataset pairs for the different folds are created that are used in the cross-validation process.

As depicted in FIG. 4, the rolling horizon of the present disclosure may be configured in accordance with several rules. For example, the sub-periods may be defined in the folds so that each resulting pair of training/test datasets is unique (i.e., every training and test dataset pairing contains unique observations). Further, within each fold, the observations included in the training dataset occur before (i.e., in time) the ones included the corresponding test dataset. Because of this, it will be appreciated that none of the training datasets will include the observations made at the end of the period. Further, the sub-period of both the training dataset and test dataset may be formed as a continuous sub-period formed within the period. In the embodiment shown, the starting time of each of the training datasets may coincide with the starting time of the period. Then, in successive folds, the training dataset may lengthen having its ending time advanced or shifted forward in time. As further shown in FIG. 4, the test dataset in each of the folds may correspond to a similarly sized sub-period, which is shifted forward in relation to the lengthening of the training dataset. A starting time of the test dataset sub-period may occur immediately subsequent to an ending time of the training dataset sub-period. In alternative embodiments, the test dataset sub-period is lengthened in relation to the lengthening of the training dataset sub-period. Preferably, this is achieved so that a substantially constant ratio is maintained between the training dataset sub-period and the test dataset sub-period. In certain embodiments, a ratio of between 1:4 and 1:3 is maintained between the length of the test dataset sub-period relative the length of the training dataset sub-period.

According to certain embodiments the period of time-series dataset may be divided into substantially equal segments, with those segments then being used to define the sub-periods of the training dataset and the test dataset in successive folds. For instance, consider the case of the timeseries period being divided into six segments, which are identified sequentially as [1, 2, 3, 4, 5, 6]. Consistent with the restrictions described above (as well as the results visually depicted in FIG. 4), the training and test dataset sub-periods may be configured in relation to those segments in the following way:

Fold 1—Training Dataset Sub-Period: segment [1]
    Test Dataset Sub-Period: segment [2]
Fold 2—Training Dataset Sub-Period: segments [1, 2]
    Test Dataset Sub-Period: segment [3]
Fold 3—Training Dataset Sub-Period: segments [1, 2, 3]
    Test Dataset Sub-Period: segment [4]
Fold 4—Training Dataset Sub-Period: segments [1, 2, 3, 4]
    Test Dataset Sub-Period: segment [5]
Fold 5—Training Dataset Sub-Period: segments [1, 2, 3, 4, 5]
    Test Dataset Sub-Period: segment [6]

The cross-validation strategy of the present invention may combine both short-term and long-term testing periods, where each short-term test dataset fold is set to be up to 4 weeks-ahead forecasts, while the long-term test dataset fold may be up to 1 year-ahead forecasts, depending on the size of the timeseries dataset. The short-term horizon cross-validation may be performed up to ten times, while the long horizon may be performed up to four times, depending on the size of the dataset. Thus, in certain embodiments, the validation process may use 14-fold cross-validation for each candidate model to find the best model and results. The candidate models may be scored by combining both short- and long-term cross-validation results. This score is then compared against every other models in order to find the best forecast method and result. For each fold, the training dataset may be used to fine-tune and optimize hyper-parameters for any particular model to find the best "fit" against the training data patterns to project the pattern out into the test dataset. This projected forecast is then compared against the test dataset, evaluated for its accuracy, and summarized for all the folds. This has been found to ensure that the select forecasting model yields workload forecast that perform well in both the short term as well as the long-term operating horizons. Consequently, the resulting forecasts can be used not only for short-term, tactical planning such as scheduling, but also for the long-term strategic planning such as hiring and capacity planning. As will be appreciated, the efficiencies related to being able to identify a single forecasting model for effective performance across short and longterm horizons are significant.

As will be appreciated, the hyper-parameters are specific to a given model. Different algorithms may be used to optimize the hyper-parameters as appropriate. For instance, for the Holt-Winters models there are the smoothing parameters $\alpha$ (alpha), $\beta$ (beta), $\gamma$ (gamma) and the dampening parameter $\pi$ (phi). The Covariance matrix adaptation evolution strategy (CMA-ES) algorithm may be leveraged to optimize the parameters. In the Single Exponential Smoothing method, the Nelder-Mead Simplex Optimizer may be used to finetune the $\alpha$ parameter. For a method like ARIMA, a grid search-based optimization may be used in conjunction with minimizing Akaike information criterion (AIC) to obtain optimal ARIMA parameters. Accordingly, a forecasting model may include a forecasting method and its most optimal hyper-parameters to use against the timeseries data to get the best forecast. After fitting all the pertinent methods for a dataset, the cross-validation process may proceed to select the best single model from a set of competing models.

Additionally, in accordance with other embodiments, a combination or an ensemble of candidate models (hereinafter "ensemble model") may be evaluated against the candidate models. An ensemble model is created by combining a plurality of the candidate models. The candidate forecasting models combined to form an ensemble model are referred to as constituent models. Ensemble models can be made up of any combination and permutation of the candidate models. Once created, ensemble forecasting models may be cross-validated in the same manner as described above. Results for the ensemble models can then be compared to the results of the most effective single candidate model to determine an overall most effective model, which can then be used in preparing operational forecasts for the contact center. An ensemble forecasting model is a combination model that produces an ensemble forecast from the results produced by a set of the candidate models. The forecast results from different constituent forecasting models are mathematically combined with the hope of producing an improved integrated forecast. The constituent models may be weighted toward finding an optimized output for a particular ensemble model.

Different approaches have been tested as to how results of the constituent models can be combined most effectively. Research has shown that taking the simple average performs well for a wide variety of timeseries datasets. The averaging may include weighting the results from the constituent models if further reduction in the forecast error can be achieved. It has been found that the simple average method outperforms other more advanced and sophisticated strategies. The explanation as to why the simple average ensemble does so well lies in the effect of finite sample-error in estimating the combining weights.

Several preferred approaches may be used in selecting which combinations of the candidate models should be combined and tested as ensemble forecasting models. A first approach is referred to as the top-k ensemble method. In this approach, the top-k candidate models for a timeseries dataset are selected. This is done by comparing the cross-validated predictions for all the candidate models. For example, if the number of candidate models is 8, the top-k of those are used to produce ensemble models. That is, different ensembles are created by combining the top-k candidate models, which provides a Top-1 ensemble model (which is simply the best single candidate model), Top-2 ensemble model (which is the top 2 candidate models), the Top-3 ensemble model (which is the top 3 candidate models) and so on. The forecast for each may be given as a simple average of the top-k combined methods, weighted, or other combinations may be used. Another approach is referred to as a best combination ensemble. In this approach, a set of all possible combinations of the candidate models is created, with each combination forming an ensemble model. For example, if the total number of candidate models is 8, the possible combinations is a set of ($2^8-1$) combinations. For each of the ensemble models, the simple average may be calculated. The ensemble model yielding the minimum error may then be compared against the best single candidate forecasting model results. Other methods for selecting ensemble forecasting models from the candidate models may also be used.

With specific reference to FIG. 5, in accordance with exemplary embodiments, a method 500 will now be discussed that relates to selecting a forecasting model from a plurality of candidate forecasting models. As will be seen, the method 500 facilitates determining the select forecasting model so to improve performance of a single forecasting model over both longterm and shorterm operating horizons. For the sake of brevity, repetitive description of already discussed technology will be limited, though it should be understood that the description provided above, as well as reasonable extensions thereof as would be readily apparent to one of skill in the applicable arts, may be applicable in the implementation of the following embodiments. The method 400 may include the following steps.

The method 500 begins, at step 505, by receiving a timeseries dataset having values associated with operational metrics of a contact center. The timeseries dataset may include timeseries data gathered within a period defined between a starting time and an ending time. The operational metrics may include input operational metrics and a target operational metric. The target operational metric relates to a workload level for the contact center, examples of which are provided above.

At a step 510, the method 500 continues by receiving the candidate forecasting models. Each of the candidate forecasting models are configured to receive the values of the input operational metrics and calculate therefrom a forecasted value for the value of the target operational metric.

At a step 515, the method 500 continues by using the timeseries dataset to test each of the candidate forecasting models in accordance with a cross-validation process.

At a step 520, the method 500 continues by selecting the select forecasting model from among the candidate forecasting models based on comparing accuracy scores calculated for the candidate forecasting models as part of the cross-validation process.

In accordance with the present invention, the cross-validation process of method 500 may include the following steps. While these steps will be described in relation to an "exemplary candidate forecasting model" of the candidate forecasting models, it should be understood that each of the candidate forecasting models undergo the same testing process.

First, a plurality of folds may be defined for the cross-validation. As described above, each fold represents a round of cross-validation that is performed using a unique training dataset and test dataset defined within the received timeseries dataset. The training dataset and the test dataset may include portions of the timeseries data occurring within respective non-overlapping and continuous sub-periods defined within the period of the timeseries dataset. The sub-periods include a training sub-period, from which the timeseries data for the training dataset is derived, and a test sub-period, from which the timeseries data for the test dataset is derived. In accordance with preferred embodiments, the sub-periods and the respective datasets are defined in accordance with a rolling horizon.

In certain embodiments, the cross-validation process may then continue by testing the accuracy of the results produced by each of the candidate models. Specifically, for each of the candidate models and for each of the defined folds, the cross-validation process includes training the exemplary candidate forecasting model using the timeseries data of the training dataset. The training of the exemplary candidate forecasting model includes fitting the exemplary candidate forecasting model to the timeseries data of the training dataset using a machine learning algorithm. Next, forecasted values are generated by at least one execution of the trained exemplary candidate forecasting model using the test dataset. The generated forecasted values constitute predicted values for the target operational metric given the values of the input operational metrics. As will be appreciated, the generated forecasted values correspond to respective actual values of the target metric as contained in the test dataset. With the predicted and actual values of the target metric, the process may proceed by calculating a fold accuracy scores for the trained exemplary candidate forecasting model, i.e., by comparing each of the generated forecasted values to the corresponding actual value of the target metric. Then the cross-validation process includes calculating the accuracy score for the exemplary candidate forecasting model by mathematically combining the fold accuracy scores produced by the exemplary candidate forecasting model for each of the folds.

In certain embodiments, the cross-validation process may include comparing accuracy of the candidate models against ensemble forecasting models. This may be done via: identifying ensemble forecasting models from the candidate forecasting models; calculating forecasted values for each of the ensemble forecasting models; and calculating the accuracy score for each of the ensemble forecasting models. The select forecasting model may then be selected from among both the candidate forecasting and the ensemble forecasting models based on comparing the accuracy scores calculated for each. As already described, each of the ensemble models is defined by the constituent models included within it, with each ensemble models having a unique combination of the candidate forecasting models. The forecasted values of each of the ensemble models are calculated by mathematically combining corresponding ones of the forecasted values as generated by each of the constituent forecasting models. The mathematically combining may include simple averaging the corresponding forecasted values of the constituent fore-casting models. The mathematically combining may include weighing the forecasted values of the constituent forecasting models. The step of identifying the ensemble forecasting models from the candidate models may include identifying possible combinations of a predetermined number of the candidate forecasting models producing top accuracy scores. Other methods may be used to configure the ensemble models as discussed above.

In accordance with exemplary embodiments, the cross-validation process may proceed with defining unique train-ing and test datasets pursuant to a rolling horizon, as discussed above. This may include defining sub-periods within the operating period of the timeseries dataset. For example, in certain embodiments, the sub-period corre-sponding to the training dataset may be lengthened in successive folds by shifting or advancing an ending time of the training dataset sub-period. While the training dataset sub-period is lengthened in successive folds, the length of the test dataset sub-period may be maintained at a substan-tially constant length. The test dataset sub-period instead may be shifted in relation to the shift of the ending time of the sub-training dataset sub-period. In each of the folds, the starting time of the training dataset sub-period may coincide with a starting time of the period. Further, the starting time of the test dataset sub-period may be arranged so that it occurs immediately subsequent to the ending time of the training dataset sub-period.

In exemplary embodiments, the accuracy score for the exemplary candidate forecasting model includes an average of the fold accuracy scores. This can also include a weighted average. The step of comparing each of the generated forecasted values to the corresponding actual value of the target metric may include calculating a symmetric mean absolute percentage error.

In certain embodiments, in response to selecting the select forecasting model, the select forecasting model may be used operation to forecast a workload level for the contact center over a future operating period. The forecasted workload level for the future operating period may then be provided as an input to a staffing forecasting model, which is configured to convert the input of the forecasted workload level into a corresponding forecasted staffing level. The staffing fore-casting model may then be executed given the provide input to generate a forecasted staffing level for the future operating period. The forecasted staffing level for the future operating period may cover both shorterm and longterm operational horizons for the contact center.

Figure 6:
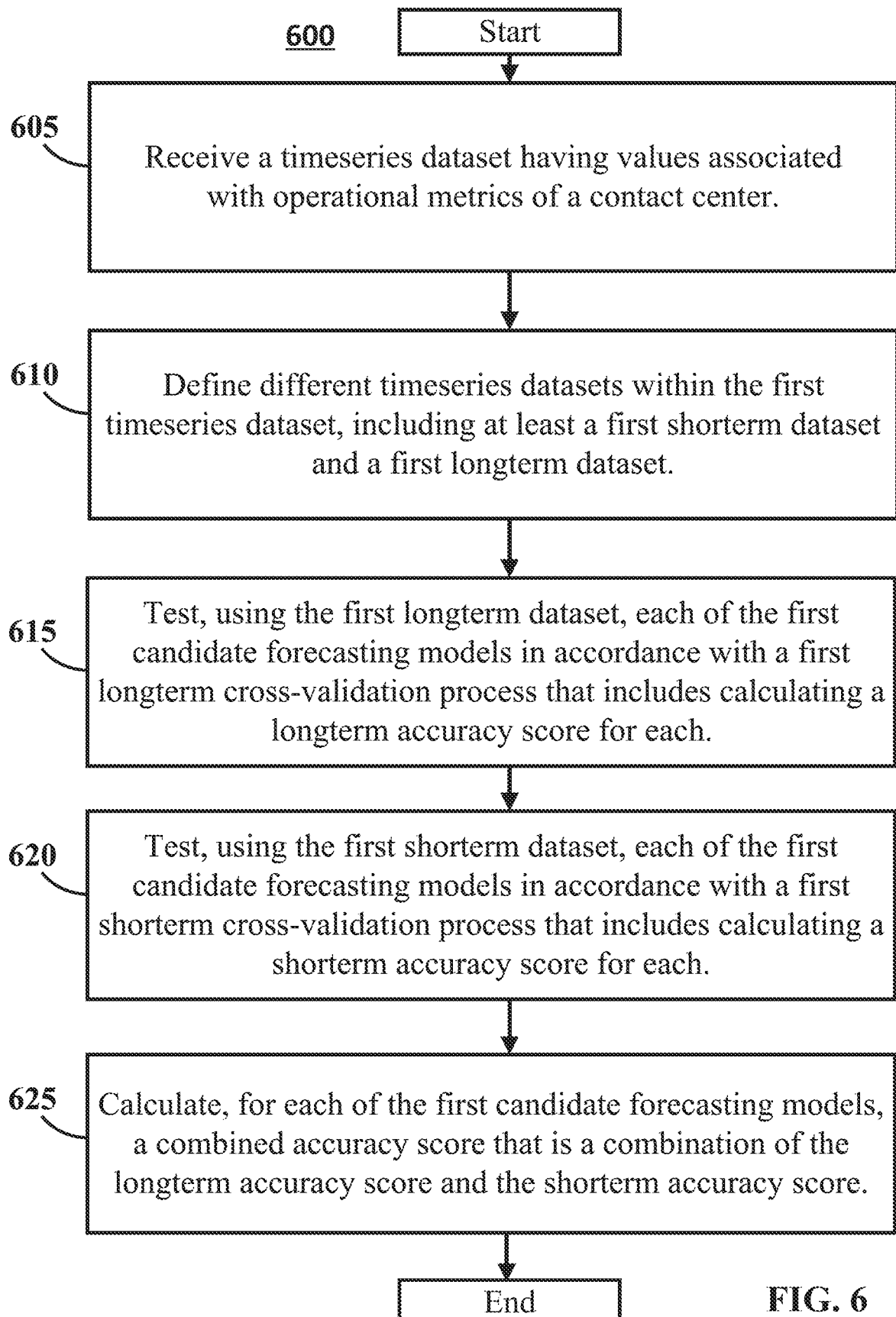
FIG. 6 is a simplified flow diagram of an alternative method related to selecting timeseries forecast models and forecast model validation in accordance with embodiments of the present disclosure.

With reference to FIG. 6, attention will now turn to another embodiment for selecting a forecasting model in accordance with the present disclosure. In this case, the forecasting models is selected for enhancing continuous timeseries workload forecasts that are effectively applicable to varying timeseries granularities and over long and shor-term operating horizons. The exemplary embodiment may include selecting, via a first selection process 600 of FIG. 6, a first select forecasting model from first candidate forecast-ing models for forecasting a workload level in accordance with a lower-granularity timeseries. For the sake of brevity, repetitive description of already discussed technology will be limited, though it should be understood that the descrip-tion provided above, as well as reasonable extensions thereof as would be readily apparent to one of skill in the applicable arts, may be applicable in the implementation of the following embodiments. The first selection process 600 may include the following steps.

The process 600 begins, at step 605, by receiving a first timeseries dataset. The first timeseries dataset may include workload data recorded during a past operating period of the contact center. In certain embodiments, the first timeseries dataset may include between 3 and 5 years of timeseries data. In certain embodiments, the first longterm dataset may be defined as including substantially an entirety of the first timeseries dataset, and the first shorterm dataset may be defined as a continuous segment terminating at a most recent end of the first timeseries dataset that encompasses between 35%-50% of the first timeseries dataset. The lower-granu-larity timeseries may have a repeating period granularity of a week or more.

The process 600 continues, at step 610, by defining different timeseries datasets within the first timeseries data-set. The different timeseries datasets may include at least a first shorterm dataset and a first longterm dataset.

The process 600 continues, at step 615, by testing, using the first longterm dataset, each of the first candidate fore-casting models in accordance with a first longterm cross-validation process. The first longterm cross-validation pro-cess may include calculating a longterm accuracy score for each of the first candidate forecasting models.

The process 600 continues, at step 620, by testing, using the first shorterm dataset, each of the first candidate fore-casting models in accordance with a first shorterm cross-validation process. The first shorterm cross-validation pro-cess includes calculating a shorterm accuracy score for each of the first candidate forecasting models.

The process 600 continues, at step 625, by calculating, for each of the first candidate forecasting models, a combined accuracy score that includes a combination of the longterm accuracy score and the shorterm accuracy score of the first longterm cross-validation process and the first shorterm cross-validation process, respectively. The process 600 may then continue by comparing the combined accuracy scores for each of the first candidate forecasting models and, based on the comparison, selecting one of the first candidate forecasting models as the first select forecasting model.

With reference now to FIG. 7, after the identification of the first select forecasting model described in FIG. 6, the process may continue by identifying a second select fore-casting model. The second select forecasting model may be configured to forecast a distribution that distributes a work-load level across a higher-granularity timeseries defined within the lower-granularity timeseries. The second select forecasting model may be selected by a second selection process, a process 700, that includes the following steps.

The process 700 begins, at step 705, by receiving a second timeseries dataset. The second timeseries dataset may include workload distribution data recorded during a past operating period of the contact center. In certain embodi-ments, in the second selection process, the second timeseries dataset includes between 0.5 and 1.5 years of timeseries data. In certain embodiments, the second longterm dataset may be defined as including substantially an entirety of the first timeseries dataset, and the second shorterm dataset may be defined as a continuous segment terminating at a most recent end of the first timeseries dataset that encompasses between 15%-35% of the second timeseries dataset. The higher-granularity timeseries may have a repeating period granularity of a day or less.

The process 700 continues, at step 710, by defining different timeseries datasets within the second timeseries dataset. The different timeseries datasets may include at least a second shorterm dataset and a second longterm dataset.

The process 700 continues, at step 715, by testing, using the second longterm dataset, each of the second candidate forecasting models in accordance with a second longterm cross-validation process. The second longterm cross-validation process includes calculating a longterm accuracy score for each of the second candidate forecasting models.

The process 700 continues, at step 720, by testing, using the second shorterm dataset, each of the second candidate forecasting models in accordance with a second shorterm cross-validation process. The second shorterm cross-validation process includes calculating a shorterm accuracy score for each of the second candidate forecasting models.

The process 700 continues, at step 720, by calculating, for each of the second candidate forecasting models, a combined accuracy score that includes a combination of the longterm accuracy score and the shorterm accuracy score of the second longterm cross-validation process and the second shorterm cross-validation process, respectively. The process 700 may then continue by comparing the combined accuracy scores for each of the second candidate forecasting models and, based on the comparison, selecting one of the second candidate forecasting models as the second select forecasting model.

In response to identifying the first select forecasting model and the second select forecasting model, the present invention may continue by automatically: executing at least one instance of the first select forecasting model to forecast a workload level applicable to the lower-granularity timeseries for a future operating period of the contact center; and executing, by providing the forecasted workload level for the future operating period as an input, at least one instance of the second select forecasting model to forecast a distribution that distributes the forecasted workload level of the future operating period across the higher-granularity timeseries defined therewithin.

In accordance with exemplary embodiments, the present invention may then combine the forecasted workload level forecasted by the first select forecasting model and the distribution forecasted by the second select forecasting model to produce the continuous timeseries workload forecasts for the contact center applicable to the varying timeseries granularities.

In accordance with exemplary embodiments, the first longterm cross-validation process and the first shorterm cross-validation process each includes a cross-validation process that defines a training dataset and a test dataset according to a rolling horizon, as described above. In accordance with exemplary embodiments, the second longterm cross-validation process and the second shorterm cross-validation process each includes a cross-validation process that defines a training dataset and a test dataset according to a rolling horizon, as described above.

In accordance with exemplary embodiments, in the first selection process, the first candidate forecasting models may include a plurality of the following types of forecasting models: Autoregressive model; Moving Average model; Autoregressive Moving Average (ARMA) model; Autoregressive Integrated Moving Average (ARIMA) model; Holt-Winter's statistical model; Theta model; Long Short-Term Memory (LSTM) Network model; Dynamic Harmonic Regression model; Exponential Smoothing model; and a Multiple Linear Regression model. In accordance with exemplary embodiments, in the second selection process, the second candidate forecasting models may include at least a plurality of the following types of forecasting models: an Average of Distribution model; Median Distribution model; Bootstrap Population Mean and Median Distribution model; Weighted Weekly Distribution model; Week-N Distribution model; and Hybrid/Ensemble Distribution model.

In accordance with exemplary embodiments, the forecasted workload level and forecasted distribution for the future operating period may be provided as an input to a staffing forecasting model. The staffing forecasting model may be configured to convert the input of the forecasted workload level into a corresponding forecasted staffing level. The staffing forecasting model may be executed with the provided input to generate a forecasted staffing level for the contact center for the future operating period. The forecasted staffing level may be comparable across the same varying timeseries granularities as the input workload forecasts.

In accordance with exemplary embodiments, the continuous timeseries workload forecast may be updated periodically as more recent data is batched and becomes available. Thus, the method may include receiving update timeseries datasets and updating therewith each of the first and second timeseries datasets. The update timeseries datasets may include the more recently gathered data. Then, the first selection process and the second selection process may be repeated using the updated first and second timeseries datasets. In this way, new first and second forecasting models may be selected to ensure that the most effective pairing is being used given the most recently gathered data.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A system for selecting a forecasting model for generating improved timeseries workload forecasts for a contact center covering varying timeseries granularities and operating horizons, the system comprising:

a processor; and a memory storing instructions which, when executed by the processor, cause the processor to perform actions including:

selecting, via a first selection process, a first select forecasting model from first candidate forecasting models for forecasting a workload level in accordance with a lower-granularity timeseries, wherein the first selection process comprises the steps of:

receiving a first timeseries dataset, the first timeseries dataset comprising workload data recorded during a past operating period of the contact center;

defining different timeseries datasets within the first timeseries dataset, the different timeseries datasets including at least a first shorterm dataset and a first longterm dataset;

testing, via a machine-learning model validation, using the first longterm dataset, each of the first candidate forecasting models in accordance with a first longterm cross-validation process that includes multiple folds, wherein the first longterm cross-validation process includes modifying a hyper-parameter of and retraining with machine learning and based on the modified hyper-parameter the each first candidate forecasting model for each fold of the multiple folds of the longterm cross-validation process and calculating a long-term accuracy score for each of the first candidate forecasting models;

testing, via the machine-learning model validation, using the first shorterm dataset, each of the first candidate forecasting models in accordance with a first shorterm cross-validation process that includes multiple folds, wherein the first shorterm cross-validation process includes modifying a hyper-parameter of and retraining with machine learning and based on the modified hyper-param-eter the each first candidate forecasting model for each fold of the multiple folds of the shorterm cross-validation process and calculating a short-erm accuracy score for each of the first candidate forecasting models;

calculating, for each of the first candidate forecasting models, a combined accuracy score that comprises a combination of the longterm accuracy score and the shorterm accuracy score of the first longterm cross-validation process and the first shorterm cross-validation process, respectively;

comparing the combined accuracy scores for each of the first candidate forecasting models and, based on the comparison, selecting one of the first can-didate forecasting models as the first select fore-casting model;

identifying a second select forecasting model, wherein the second select forecasting model is configured to forecast a distribution that distributes a workload level across a higher-granularity timeseries defined within the lower-granularity timeseries;

automatically, in response to identifying the first select forecasting model and the second select forecasting model:

executing at least one instance of the first select forecasting model to forecast a workload level applicable to the lower-granularity timeseries for a future operating period of the contact center; and executing, by providing the forecasted workload level for the future operating period as input thereto, at least one instance of the second select forecasting model to forecast a distribution that distributes the forecasted workload level of the future operating period across the higher-granu-larity timeseries defined therewithin;

wherein the second select forecasting model is selected by a second selection process that comprises the steps of:

receiving a second timeseries dataset, the second timeseries dataset comprising workload distribu-tion data recorded during a past operating period of the contact center;

defining different timeseries datasets within the sec-ond timeseries dataset, the different timeseries datasets including at least a second shorterm data-set and a second longterm dataset;

testing, via the machine-learning model validation, using the second longterm dataset, each of the second candidate forecasting models in accor-dance with a second longterm cross-validation process, wherein the second longterm cross-vali-dation process includes modifying a hyper-param-eter of and retraining with machine learning and based on the modified hyper-parameter the each second candidate forecasting model for each fold of the multiple folds of the longterm cross-vali-dation process and calculating a longterm accu-racy score for each of the second candidate fore-casting models;

testing, via the machine-learning model validation, using the second shorterm dataset, each of the second candidate forecasting models in accor-dance with a second shorterm cross-validation process, wherein the second shorterm cross-vali-dation process includes modifying a hyper-param-eter of and retraining with machine learning and based on the modified hyper-parameter the each second candidate forecasting model for each fold of the multiple folds of the shorterm cross-vali-dation process and calculating a shorterm accu-racy score for each of the second candidate fore-casting models;

calculating, for each of the second candidate fore-casting models, a combined accuracy score that comprises a combination of the longterm accuracy score and the shorterm accuracy score of the second longterm cross-validation process and the second shorterm cross-validation process, respec-tively;

comparing the combined accuracy scores for each of the second candidate forecasting models and, based on the comparison, selecting one of the second candidate forecasting models as the second select forecasting model;

wherein, in the first selection process, the first time-series dataset comprises between 3 and 5 years of timeseries data, wherein the first longterm dataset is defined as including substantially an entirety of the first timeseries dataset, and the first shorterm dataset is defined as a continuous segment terminating at a most recent end of the first timeseries dataset that encompasses between 35%-50% of the first time-series dataset;

wherein, in the second selection process, the second timeseries dataset comprises between 0.5 and 1.5 years of timeseries data;

wherein:

the second longterm dataset is defined as including substantially an entirety of the second timeseries dataset; and the second shorterm dataset is defined as a continu-ous segment terminating at a most recent end of the second timeseries dataset that encompasses between 15%-35% of the second timeseries data-set, wherein, in the first selection process, the first longterm cross-validation process and the first shorterm cross-validation process each comprises a cross-validation process that defines a training dataset and a test dataset according to a rolling horizon, wherein, in the second selection process, the second longterm cross-validation process and the second shorterm cross-validation process each comprises a cross-validation process that defines a training dataset and a test dataset according to a rolling horizon; and fine tuning the hyper-parameters of the machine learning based on the cross-validation processes.

2. The system of claim 1, wherein the memory further stores instructions which, when executed by the processor, cause the processor to perform further actions including:

combining the forecasted workload level forecasted by the first select forecasting model and the distribution forecasted by the second select forecasting model to produce the continuous timeseries workload forecasts for the contact center applicable to the varying timeseries granularities.

3. The system of claim 1, wherein, in the first selection process, the first candidate forecasting models comprise at least 3 of the following types of forecasting models: an Autoregressive Integrated Moving Average (ARIMA) model; Holt-Winter's statistical model; Theta model; Long Shorterm Memory (LSTM) Network model; Dynamic Harmonic Regression model; Moving Average model; and Multiple Linear Regression model.

4. The system of claim 1, wherein, in the second selection process, the second candidate forecasting models comprise at least 3 of the following types of forecasting models: an Average of Distribution model; Median Distribution model; Weighted Weekly Distribution model; Week-N Distribution model; Bootstrap Population Mean and Median Distribution model; and Hybrid/Ensemble Distribution model.

5. The system of claim 1, wherein the memory further stores instructions which, when executed by the processor, cause the processor to perform further actions including:

providing the forecasted workload level and forecasted distribution for the future operating period as an input to a staffing forecasting model, wherein the staffing forecasting model is configured to convert the input of the forecasted workload level into a corresponding forecasted staffing level; and executing the staffing forecasting model with the provided input to generate a forecasted staffing level for the contact center for the future operating period, the forecasted staffing level being comparable across the same varying timeseries granularities as the input workload forecasts.

6. The system of claim 1, wherein the lower-granularity timeseries comprises a repeating period granularity of a week or more; and wherein the higher-granularity timeseries comprises a repeating period granularity of a day or less.

7. The system of claim 1, wherein the memory further stores instructions which, when executed by the processor, cause the processor to perform further actions including:

receiving update timeseries datasets and updating therewith each of the first and second timeseries datasets, wherein the update timeseries datasets comprises data gathered more recently than the data included each of the first and second timeseries datasets; and repeating the first selection process and the second selection process using the updated first and second timeseries datasets and, thereby, reselecting the first select forecasting model from the first candidate forecasting models and the second select forecasting model from the second candidate forecasting models.

8. The system of claim 1, wherein the instructions, when executed by the processor, additionally cause the processor to generate an ensemble model by combining a plurality of the first candidate forecasting models.

9. The system of claim 8, wherein the instructions, when executed by the processor, additionally cause the processor to:

combine results of the plurality of first candidate forecasting models within the ensemble model; and compare an accuracy of the combined results from the ensemble model to an accuracy of individual results of each first candidate forecasting model to determine whether the ensemble model provides more accurate forecasts than the individual first candidate forecasting models.

10. A computer-implemented method for selecting forecasting models for generating improved timeseries workload forecasts for a contact center covering varying timeseries granularities and operating horizons, the method comprising the steps of:

selecting, via a first selection process, a first select forecasting model from first candidate forecasting models for forecasting a workload level in accordance with a lower-granularity timeseries, wherein the first selection process comprises the steps of:

receiving a first timeseries dataset, the first timeseries dataset comprising workload data recorded during a past operating period of the contact center;

defining different timeseries datasets within the first timeseries dataset, the different timeseries datasets including at least a first shorterm dataset and a first longterm dataset;

testing, via a machine-learning model validation, using the first longterm dataset, each of the first candidate forecasting models in accordance with a first longterm cross-validation process that includes multiple folds, wherein the first longterm cross-validation process includes modifying a hyper-parameter of and retraining with machine learning and based on the modified hyper-parameter the each first candidate forecasting model for each fold of the multiple folds of the longterm cross-validation process and calculating a longterm accuracy score for each of the first candidate forecasting models;

testing, via the machine-learning model validation, using the first shorterm dataset, each of the first candidate forecasting models in accordance with a first shorterm cross-validation process that includes multiple folds, wherein the first shorterm cross-validation process includes modifying a hyper-parameter of and retraining with machine learning and based on the modified hyper-parameter the each first candidate forecasting model for each fold of the multiple folds of the shorterm cross-validation process and calculating a shorterm accuracy score for each of the first candidate forecasting models;

calculating, for each of the first candidate forecasting models, a combined accuracy score that comprises a combination of the longterm accuracy score and the shorterm accuracy score of the first longterm cross-validation process and the first shorterm cross-validation process, respectively;

comparing the combined accuracy scores for each of the first candidate forecasting models and, based on the comparison, selecting one of the first candidate forecasting models as the first select forecasting model;

identifying a second select forecasting model, wherein the second select forecasting model is configured to forecast a distribution that distributes a workload level across a higher-granularity timeseries defined within the lower-granularity timeseries;

automatically, in response to identifying the first select forecasting model and the second select forecasting model:

executing at least one instance of the first select forecasting model to forecast a workload level applicable to the lower-granularity timeseries for a future operating period of the contact center; and executing, by providing the forecasted workload level for the future operating period as input thereto, at least one instance of the second select forecasting model to forecast a distribution that distributes the forecasted workload level of the future operating period across the higher-granularity timeseries defined therewithin;

combining the forecasted workload level forecasted by the first select forecasting model and the distribution forecasted by the second select forecasting model to produce the continuous timeseries workload forecasts for the contact center applicable to the varying timeseries granularities;

wherein the second select forecasting model is selected by a second selection process that comprises the steps of:

receiving a second timeseries dataset, the second timeseries dataset comprising workload distribution data recorded during a past operating period of the contact center;

defining different timeseries datasets within the second timeseries dataset, the different timeseries datasets including at least a second shorterm dataset and a second longterm dataset;

testing, via the machine-learning model validation, using the second longterm dataset, each of the second candidate forecasting models in accordance with a second longterm cross-validation process, wherein the second longterm cross-validation process includes modifying a hyper-parameter of and retraining with machine learning and based on the modified hyper-parameter the each second candidate forecasting model for each fold of the multiple folds of the longterm cross-validation process and calculating a longterm accuracy score for each of the second candidate forecasting models;

testing, via the machine-learning model validation, using the second shorterm dataset, each of the second candidate forecasting models in accordance with a second shorterm cross-validation process, wherein the second shorterm cross-validation process includes modifying a hyper-parameter of and retraining with machine learning and based on the modified hyper-parameter the each second candidate forecasting model for each fold of the multiple folds of the longterm cross-validation process and calculating a shorterm accuracy score for each of the second candidate forecasting models;

calculating, for each of the second candidate forecasting models, a combined accuracy score that comprises a combination of the longterm accuracy score and the shorterm accuracy score of the second longterm cross-validation process and the second shorterm cross-validation process, respectively;

comparing the combined accuracy scores for each of the second candidate forecasting models and, based on the comparison, selecting one of the second candidate forecasting models as the second select forecasting model;

wherein, in the first selection process, the first timeseries dataset comprises between 3 and 5 years of timeseries data, and in the second selection process, the second timeseries dataset comprises between 0.5 and 1.5 years of timeseries data;

wherein:

the first longterm dataset is defined as including substantially an entirety of the first timeseries dataset; and the first shorterm dataset is defined as a continuous segment terminating at a most recent end of the first timeseries dataset that encompasses between 35%-50% of the first timeseries dataset;

wherein:

the second longterm dataset is defined as including substantially an entirety of the second timeseries dataset; and the second shorterm dataset is defined as a continuous segment terminating at a most recent end of the second timeseries dataset that encompasses between 15%-35% of the second timeseries dataset, wherein, in the first selection process, the first longterm cross-validation process and the first shorterm cross-validation process each comprises a cross-validation process that defines a training dataset and a test dataset according to a rolling horizon wherein, in the second selection process, the second longterm cross-validation process and the second shorterm cross-validation process each comprises a cross-validation process that defines a training dataset and a test dataset according to a rolling horizon; and fine tuning the hyper-parameters of the machine learning based on the cross-validation processes.

11. The method of claim 10, wherein, in the first selection process, the first candidate forecasting models comprise at least 3 of the following types of forecasting models: an Autoregressive Integrated Moving Average (ARIMA) model; Holt-Winter's statistical model; Theta model; Long Shorterm Memory (LSTM) Network model; Dynamic Harmonic Regression model; Moving Average model; and Multiple Linear Regression model; and wherein, in the second selection process, the second candidate forecasting models comprise at least 3 of the following types of forecasting models: an Average of Distribution model; Median Distribution model; Weighted Weekly Distribution model; Week-N Distribution model; Bootstrap Population Mean and Median Distribution model; and Hybrid/Ensemble Distribution model.

12. The method of claim 10, wherein the memory further stores instructions which, when executed by the processor, cause the processor to perform further actions including:

providing the forecasted workload level and forecasted distribution for the future operating period as an input to a staffing forecasting model, wherein the staffing forecasting model is configured to convert the input of the forecasted workload level into a corresponding forecasted staffing level; and executing the staffing forecasting model with the provided input to generate a forecasted staffing level for the contact center for the future operating period, the forecasted staffing level being comparable across the same varying timeseries granularities as the input workload forecasts.

13. The method of claim 10, wherein the lower-granularity timeseries comprises a repeating period granularity of a week or more; and wherein the higher-granularity timeseries comprises a repeating period granularity of a day or less.

* * * * *